April 7, 1942. G. MAIURI 2,278,889
REFRIGERATING MACHINES ARRANGED IN CASCADE RELATIONSHIP
Filed May 15, 1940
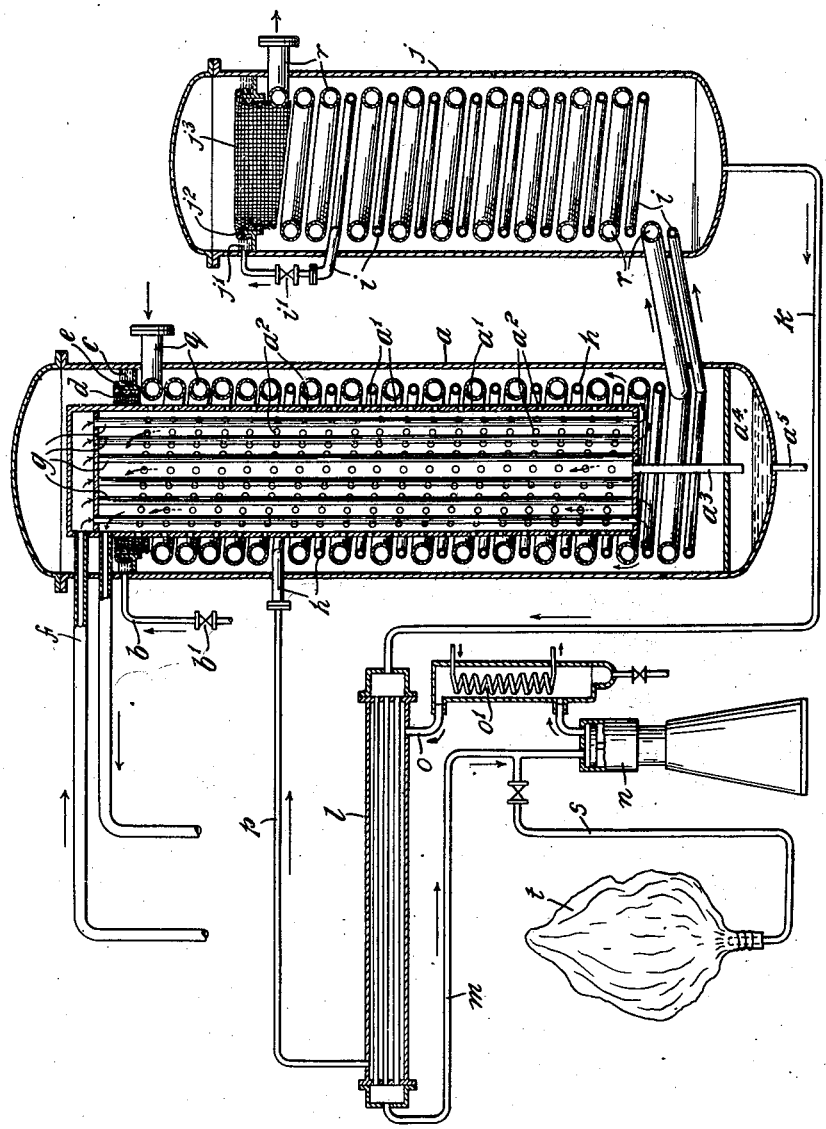
Inventor
GUIDO MAIURI
BY: Francis E. Boyce
ATTORNEY Patented Apr. 7, 1942

2,278,889

UNITED STATES PATENT OFFICE 2,278,889

REFRIGERATING MACHINES ARRANGED IN CASCADE RELATIONSHIP

Guido Maiuri, Aldwych, London, England

Application May 15, 1940, Serial No. 335,236
In Great Britain May 3, 1939

2 Claims. (Cl. 62—115)

This invention relates to refrigerating machines, wherein one refrigerating cycle producing a sub-atmospheric temperature is employed to condense at sub-atmospheric temperature a refrigerant in another refrigerating cycle producing a lower sub-atmospheric temperature, the two refrigerating cycles therefore being in cascade relationship.

It has already been proposed in patent specification No. 2,153,020, to employ an absorption refrigerating cycle wherein a refrigerant evaporates and diffuses into an inert gas under increasing partial pressures of the refrigerant and therefore produces a range of temperatures, to condense the refrigerant of a similar absorption refrigerating cycle in cascade relationship therewith and producing a lower range of sub-atmospheric temperatures.

It has also already been proposed to operate a compression refrigerating cycle with a mixture of refrigerants, each condensing and evaporating at different temperatures.

The object of the present invention is to increase the economy of operation of refrigerating cycles in cascade relationship of which the lower temperature stage is a compression refrigerating cycle, and more especially, but not essentially, a compression refrigerating cycle wherein a mixture of refrigerants is employed each condensing and evaporating at different temperatures.

Broadly, the present invention consists in a cascade system of refrigerating machines, in which an absorption refrigerating cycle is operated in cascade relationship with a compression refrigerating cycle to condense and sub-cool the compressed refrigerant thereof. The mere fact that an absorption refrigerating cycle, instead of a compression refrigerating cycle, is employed to provide the higher temperature stage in refrigerating machines in cascade relationship the lower temperature stage of which is a compression refrigerating cycle, leads to appreciable economy in operation. Such economy is, however, considerably increased when, according to a development of the invention, an absorption refrigerating cycle wherein a refrigerant evaporates and diffuses into an inert gas under increasing partial pressures of the refrigerant and produces a range of temperatures, is operated in cascade relationship with a compression refrigerating cycle to condense and sub-cool the compressed refrigerant thereof.

The nearer the condensed compressed refrigerant is sub-cooled to the vaporisation temperature at the pressure at which such condensed refrigerant is allowed to expand, the better is the efficiency, as less of the cold produced is required to cool the condensed refrigerant on entering the evaporator of the compression cycle.

In order to condense a compressed refrigerant vapour, both the sensible heat due to compression and the latent heat of vaporisation have to be abstracted therefrom, the latter being the greater quantity, and far exceeding the sensible heat which has to be extracted from the condensed refrigerant to sub-cool the condensed refrigerant as nearly as possible to the temperature of vaporisation at a considerably lower pressure. Thus a considerable part of the heat can be extracted from the compressed refrigerant at a relatively high sub-atmospheric temperature. By utilising a diffusion absorption refrigerating cycle producing a range of temperatures to condense and sub-cool the compressed refrigerant, the major portion of the heat can be extracted therefrom at the higher portion of the range of temperatures, leaving only the sub-cooling of the condensed refrigerant to be effected by the lower portion of the range of temperatures. This is very effectively provided for in a diffusion refrigerating cycle wherein a refrigerant evaporates and diffuses into an inert gas under increasing partial pressures of the refrigerant, because normally the amount of refrigerant which must evaporate to increase the partial pressure increases at a rapidly increasing rate as the partial pressure increases. Thus more cold, i. e. heat-absorbing capacity, is normally produced at the higher portion than at the lower portion of the range of temperatures.

To obtain an appreciable range of temperatures in a diffusion absorption refrigerating cycle, the inert gas into which the refrigerant evaporates must be present in so small an amount that the maximum partial pressure of the refrigerant somewhat closely approaches the total pressure in the evaporator. The inert gas therefore is not present in such quantity as to equalise the total pressures in the generator and condenser on the one hand and evaporator and absorber on the other hand, of the absorption refrigerating cycle, and the rich absorption liquor is raised to the generator pressure by a pump, and the liquefied refrigerant and the weak absorption liquor pass expansion valves to reach the evaporator and absorber respectively. A low minimum temperature can be obtained by pre-cooling the inert gas and the refrigerant approximately to the evaporator temperature, before admission thereof to the evaporator.

When, as already mentioned, a mixture of refrigerants, each condensing and evaporating at different temperatures is employed in the compression cycle, the additional advantage is obtained that the latent heat of vaporisation of the less volatile is removed at a higher portion of the range of temperatures, leaving only the latent heat of vaporisation of the more volatile to be removed at a lower portion of the range of temperatures and the sub-cooling of the condensed refrigerant along the lowest portion of the range of temperatures, of the diffusion absorption refrigerating cycle.

With a mixture of refrigerants condensing and evaporating at different temperatures in the compression cycle, the more volatile becomes absorbed in the condensed less volatile as well as eventually becoming condensed. There is therefore latent heat rendered sensible by absorption which is abstracted by the cooling along the range of temperatures. Similarly in the evaporator of the compression refrigerating cycle when a mixture of refrigerants evaporating at different temperatures is employed, the more volatile being in solution in the less volatile will evaporate progressively from a progressively weaker solution, and therefore at progressively increasing temperatures. Thus in the evaporator of the compression refrigerating cycle, a range of temperatures will in such case be produced. This range is extended upwards by the less volatile refrigerant eventually evaporating under increasing partial pressures thereof, into the already vaporised more volatile refrigerant.

Ammonia and water, with nitrogen or hydrogen as the inert gas, are suitable for use as the refrigerant and the absorbent in the diffusion absorption cycle.

Ethylene, ethane and methane are suitable refrigerants to be used separately, or as a mixture in various proportions, in the compression refrigerating cycle.

An example of an evaporator of a diffusion absorption refrigerating machine arranged in cascade relationship with a compression refrigerating machine is illustrated somewhat diagrammatically in sectional elevation on the accompanying drawing.

In this drawing, $a$ is a modified evaporator of a diffusion absorption refrigerating machine according to the specification of Patent No. 2,153,020. The generator, condenser and absorber of the diffusion refrigerating machine are not shown, but are as described in the said patent specification.

The condensed liquid refrigerant from the condenser of the machine, after traversing the usual heat-exchanger (not shown), is supplied by a pipe $b$, past an expansion valve $b^1$, into an annular trough $c$ at the top of the evaporator $a$. Thence the liquid refrigerant overflows a weir $d$ straddled by a wick $e$ from which it drips.

Inert gas arrives by a pipe $f$ from the absorber and passes down a nest of tubes $g$ to ascend outside a hollow cylindrical core $a^1$ within the evaporator $a$, in contra-flow with the liquid refrigerant dripping therein. In ascending the annular space between the core $a^1$ and the wall of the evaporator $a$, the inert gas progressively escapes into the interior of the core $a^1$ through a helical row of holes $a^2$. In so escaping the gas is accompanied by evaporated refrigerant. Owing to the progressive escape of the inert gas the rate of increase of the partial pressure of refrigerant is rendered more uniform, as explained in the specification of Patent No. 2,153,020.

Any liquid refrigerant carried by the gas into the hollow core $a^1$ through the holes $a^2$, drains by a pipe $a^3$ into a closed space $a^4$ in the bottom of the evaporator, from whence it drains to the absorber by a pipe $a^5$.

The condenser pipe coil $h$ of a compression refrigerating machine is located in the evaporator $a$ of the diffusion absorption refrigerating machine.

The condenser coil $h$ is connected to an ascending pipe coil $i$ in the evaporator $j$ of the compression refrigerating machine, whereby liquid refrigerant is delivered past an expansion valve $i^1$ into an annular trough $j^1$ in the top of the evaporator $j$. The liquid refrigerant in the evaporator $j$ overflows a weir $j^2$ straddled by a wick $j^3$, from which it drips on to the pipe coil $i$.

A pipe $k$ connects the evaporator $j$ to a heat-exchanger $l$ connected by a pipe $m$ to the compressor $n$ of the compression refrigerating machine.

The refrigerant compressed by the compressor $n$ and cooled to atmospheric temperature by a water-cooling coil $o^1$, is led by a pipe $o$ to the heat-exchanger $l$, and thence by a pipe $p$ to the upper end of the condenser coil $h$.

The two evaporators $a$ and $j$ cool in series gas flowing in a coiled pipe $q$ within the evaporator $a$ and a coiled pipe $r$ connected thereto and within the evaporator $j$.

The liquid refrigerant drips from the wicks $e$ and $j^3$ on to the respective pipe coils less $q$ and $r$.

The temperature in the evaporator $a$ of the diffusion absorption refrigerating machine increases upwards within the machine in view of the increasing partial pressure of refrigerant in the inert gas as it ascends in the evaporator $a$.

With a mixture of refrigerants in the evaporator $j$ of the compression refrigerating machine, the temperature of evaporation progressively increases downwards in the evaporator, as the more volatile refrigerant will evaporate first and at a lower temperature than the less volatile. The gas to be cooled is therefore led downwards in the pipe coil $q$ in the evaporator $a$ and upwards in the pipe coil $r$ in the evaporator $j$, so as to flow in the direction of decreasing temperatures.

To avoid leakages of refrigerant vapour, the compressor $n$ is arranged to exert a suction at approximately atmospheric pressure. The pipe $m$ has branched therefrom a pipe $s$ terminating in a balloon $t$ which serves as a reservoir whereby the suction can remain at approximately atmospheric pressure.

A cascade system of refrigerating machines wherein an absorption refrigerating cycle is used to condense and sub-cool the compressed refrigerant of a compression refrigerating cycle, as above described, can be operated with advantage by high pressure steam. The high pressure steam is first used in a steam engine exhausting at several atmospheres pressure, to drive the compressor of the compression refrigerating cycle. The exhaust steam at a sufficiently super-atmospheric pressure and therefore sufficiently elevated temperature, is then used to heat the generator of the absorption refrigerating cycle wherein refrigerant vapour is driven off at super-atmospheric pressure. Thus expansion of the steam in the steam engine is utilised to drive the compressor of the compression refrigerating cycle, whilst the latent heat of the steam condensing at superatmospheric pressure is utilised to heat the generator of the absorption refrigerating cycle. In most cases the quantity of steam required to operate the absorption or diffusion absorption refrigerating cycle is nearly equal to the quantity of steam required to drive the steam engine driving the compressor of the compression refrigerating cycle and a great economy in fuel is thus obtained because the same steam is used in two stages, first operating by static pressure and then by conversion of latent heat into sensible heat.

Assuming that it is desired to cool air or other permanent gas from $+20°$ C. to $-110°$ C., which necessitates a minimum temperature of evaporation of refrigerant of $-120°$ C., the following examples show the horse power required to effect this with a cascade compression refrigerating machine compared with a cascade refrigerating machine of which the higher temperature stage is a diffusion absorption refrigerating cycle and the lower a compression refrigerating cycle.

With a purely compression refrigerating machine, two stages of compression of ammonia are required to obtain $-50°$ C. and therewith to condense ethane at $-45°$ C. to obtain $-80°$ C., which in turn is used to condense ethylene or other suitable gas at $-75°$ C. to obtain $-120°$ C. Thus four stages of compression in all are required, three of which are in cascade. Assuming 100,000 frigories are required for cooling the air or other gas, this purely compression system requires in practice at least 450 H. P. for its operation.

A diffusion absorption refrigerating machine according to patent specifications Nos. 2,131,782 and 2,153,020, can evaporate ammonia at as low a temperature as $-75°$ C. This can be used to cool the air or other gas from $+20°$ C. to $-65°$ C. 65,000 frigories are required if 100,000 frigories would be the total required to cool the air to $-110°$ C. The remaining 35,000 frigories required for cooling the air or other gas from $-65°$ C. to $-110°$ C. are obtained with a compression refrigerating machine in which a mixture of ethane and methane with or without other refrigerants evaporates along a range of temperatures from $-120°$ C. to $-80°$ C. This mixture evaporates along the range of temperatures, and also condenses along a range of temperatures, for instance along the range $-45°$ C. to $-70°$ C. obtained in the diffusion absorption refrigerating machine. The average evaporation temperature is therefore $-100°$ C. and the average condensation temperature is therefore $-58°$ C. To obtain this, 70,000 frigories for condensing and 50 H. P. for driving the compressor are required.

The diffusion absorption refrigerating machine has to give a total of 135,000 frigories and requires for its operation 700 kg. of steam per hour at 4 atmospheres absolute. This steam can be generated at 16 atmospheres absolute and superheated to 330° C. and expanded in a steam engine, driving the compressor of the compression refrigerating machine, to 4 atmospheres absolute. The exhaust steam at 4 atmospheres absolute is condensed in the generator of the diffusion absorption refrigerating machine.

One H. P. can be obtained from 13 to 14 kg. of steam. Thus the 700 kg. of steam, producing the 50 H. P. used for driving the compression refrigerating machine can also be used to provide by its latent heat, the heat required for operating the diffusion absorption refrigerating machine.

With a purely compression refrigerating system and requiring a larger amount of cooling water than the diffusion absorption refrigerating machine, and driven by a steam engine exhausting freely to the atmosphere, 4500 kg. of steam would be required. With a condensing steam engine more than double the amount of cooling water would be required, and 3,200 kg. of steam would still be required in practice.

If the comparison is made with burning natural gas of 10,000 calories per cubic metre to supply the heat for the diffusion absorption refrigerating machine, and electricity to drive the compression refrigerating machine, 40 cubic metres of gas would be required for the former and 45 kw. for the latter, against 400 kw. for a purely compression cascade refrigerating machine. At one cent per cubic metre of gas and one cent per kw., the cost per hour would be $0.85 as against $4.00. In a year of 300 working days the cost would be $6,247.50 as against $29,400.00.

A cascade system of refrigerating machines employing a diffusion absorption refrigerating cycle as the higher temperature stage, and a compression refrigerating cycle with one or more refrigerants, as the lower temperature stage, as above described, can be utilised to liquefy gases and to extract condensible constituents from gases. The gas or vapour or a portion thereof, is conducted in heat-exchange contra-flow with the inert gas and evaporating refrigerant in the evaporator of the diffusion absorption refrigerating cycle, and then in heat-exchange proximity with the evaporator of the compression refrigerating cycle.

Treated gas is, as usual, led in contra-flow heat-exchange with the gas to be treated, so economising refrigeration.

Gas such as air to be liquefied is compressed to the required pressure, which the refrigeration enables to be lower than in normal gas liquefying plants, and as usual cooled to atmospheric temperature, before being refrigerated by the cascade machine and reverse flowing expanded gas. The compressed gas supply may be divided, a portion being refrigerated by the cascade machine and the remainder by the reverse flowing expanded gas. Owing to the specific heat of compressed gas being higher than that of gas at atmospheric pressure, and owing to part of the gas which is compressed being removed in the liquefied state, the capacity of the reverse flowing expanded gas alone is insufficient to cool fully the compressed gas.

More volatile constituents of the vapour which is being cooled, such as water, are condensed at the higher portions of the temperature range in the diffusion absorption cycle, with consequent economy.

I claim:

1. A diffusion absorption refrigerating machine containing an inert gas combined with a compression refrigerating machine and comprising, an evaporator of said diffusion absorption refrigerating machine, a condenser of said compression refrigerating machine extending through said evaporator of said diffusion absorption refrigerating machine along a region of decreasing temperatures, an evaporator of said compression refrigerating machine, and a conduit extending through both said evaporators and conveying fluid in the direction of said decreasing temperatures.

2. A diffusion absorption refrigerating machine containing an inert gas combined with a compression refrigerating machine and comprising, an evaporator of said diffusion absorption refrigerating machine, means for supplying liquid refrigerant to flow downwards in said evaporator, means for admitting inert gas to flow upwards into contact with said liquid refrigerant in said evaporator, a condenser of said compression refrigerating machine extending downwards through said evaporator of said diffusion absorption refrigerating machine, an evaporator of said compression refrigerating machine connected to the lower end of said condenser of said compression refrigerating machine, means for supplying liquid refrigerant to flow downwards in said evaporator of said compression refrigerating machine, and a conduit extending and conveying fluid downwards through said evaporator of said diffusion absorption refrigerating machine and upwards through said evaporator of said compression refrigerating machine.

GUIDO MAIURI.